United States Patent
Mezaael

(10) Patent No.: US 11,169,797 B2
(45) Date of Patent: Nov. 9, 2021

(54) VEHICLE CONTROLLER CONFIGURATION BACKUP AND RESTORATION USING DATA SNAPSHOTS

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/282,795

(22) Filed: Feb. 22, 2019

(65) Prior Publication Data

US 2020/0272455 A1    Aug. 27, 2020

(51) Int. Cl.
*G06F 8/71* (2018.01)
*H04W 4/46* (2018.01)
*B60R 16/023* (2006.01)

(52) U.S. Cl.
CPC .............. *G06F 8/71* (2013.01); *B60R 16/023* (2013.01); *H04W 4/46* (2018.02)

(58) Field of Classification Search
CPC ...... H04L 2209/84; H04W 4/44; H04W 4/46; G06F 8/65; G06F 11/1469; B60R 16/023
See application file for complete search history.

(56) References Cited

U.S. PATENT DOCUMENTS

| | | | |
|---|---|---|---|
| 6,230,082 B1 * | 5/2001 | Harada | B60R 16/0315 180/272 |
| 7,450,603 B2 | 11/2008 | Nix et al. | |
| 8,140,358 B1 | 3/2012 | Ling et al. | |
| 8,508,353 B2 | 8/2013 | Cook et al. | |
| 8,959,299 B2 | 2/2015 | Ngo et al. | |
| 10,073,650 B2 | 9/2018 | Nara et al. | |
| 2006/0129878 A1 | 6/2006 | Sato et al. | |
| 2006/0230081 A1 * | 10/2006 | Craswell | G06F 11/1448 |
| 2009/0144341 A1 * | 6/2009 | Hauck | G06F 11/1458 |
| 2010/0106925 A1 * | 4/2010 | Grohman | G05B 15/02 711/162 |
| 2010/0325167 A1 * | 12/2010 | Landry | G06F 11/1469 707/802 |
| 2014/0289202 A1 * | 9/2014 | Chan | G06F 9/54 707/652 |
| 2017/0106886 A1 * | 4/2017 | Shubs, Jr. | B61L 27/04 |
| 2018/0001899 A1 | 1/2018 | Shenoy et al. | |

* cited by examiner

*Primary Examiner* — S. Sough
*Assistant Examiner* — Cheneca Smith
(74) *Attorney, Agent, or Firm* — Michael Spenner; Brooks Kushman P.C.

(57) ABSTRACT

A vehicle includes a processor, programmed to responsive to detecting a configuration modification to a controller of the vehicle, generate a snapshot to record a current configuration of the controller as modified; and responsive to detecting an authorized digital entity wirelessly connected to the vehicle, send the snapshot to the digital entity to back up the snapshot, wherein the snapshot includes configurations of multiple controllers of the vehicle including the current configuration.

13 Claims, 3 Drawing Sheets

VEHICLE CONTROLLER CONFIGURATION BACKUP AND RESTORATION USING DATA SNAPSHOTS

TECHNICAL FIELD

The present disclosure generally relates to vehicle controller configuration. More specifically, the present disclosure relates to backup and restoration of vehicle controller configurations using data snapshots.

BACKGROUND

Modern vehicles are provided with various features enabled using multiple electronic control units (ECUs) (a.k.a. controllers). For instance, a vehicle may be provided with a telematics control unit (TCU) configured to enable telecommunication features. The vehicle may be further provided with a navigation controller configured to provide navigation features. Many of those controllers are provided with storage capabilities to store configuration data customized for specific vehicles and users. The TCU may have a unique identification and may be subscribed to specific network services, while the navigation controller may store customized preferences and various addresses used by the user. In case that the one or more controllers fail and need to be replaced, some of the customized information may be difficult to restore manually.

SUMMARY

In one or more illustrative embodiment of the present disclosure, a vehicle includes a processor, programmed to responsive to detecting a configuration modification to a controller of the vehicle, generate a snapshot to record a current configuration of the controller as modified; and responsive to detecting an authorized digital entity wirelessly connected to the vehicle, send the snapshot to the digital entity to back up the snapshot, wherein the snapshot includes configurations of multiple controllers of the vehicle including the current configuration.

In one or more illustrative embodiment of the present disclosure, a vehicle includes a processor, programmed to responsive to detecting a designated controller is replaced by a new controller, download a data snapshot of the designated controller from a digital entity connected to the vehicle via a wireless connection, and restore a configuration of the designated controller to the new controller using the data snapshot.

In one or more illustrative embodiment of the present disclosure, a method for a vehicle includes responsive to detecting a configuration modification for a designated controller, generating a data snapshot to record a current configuration of the designated controller as modified; responsive to detecting, an authorized digital entity to the vehicle via a wireless connection, sending the data snapshot to the digital entity; responsive to detecting the designated controller is replaced by a new controller, downloading the data snapshot from the authorized digital entity; and restoring a configuration for the designated controller to the new controller using the data snapshot.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may he combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a system for backing up and restoring vehicle controller configurations/settings. More specifically, the present disclosure proposes a system for backing up and restoring configurations using data snapshots.

Figure 1:
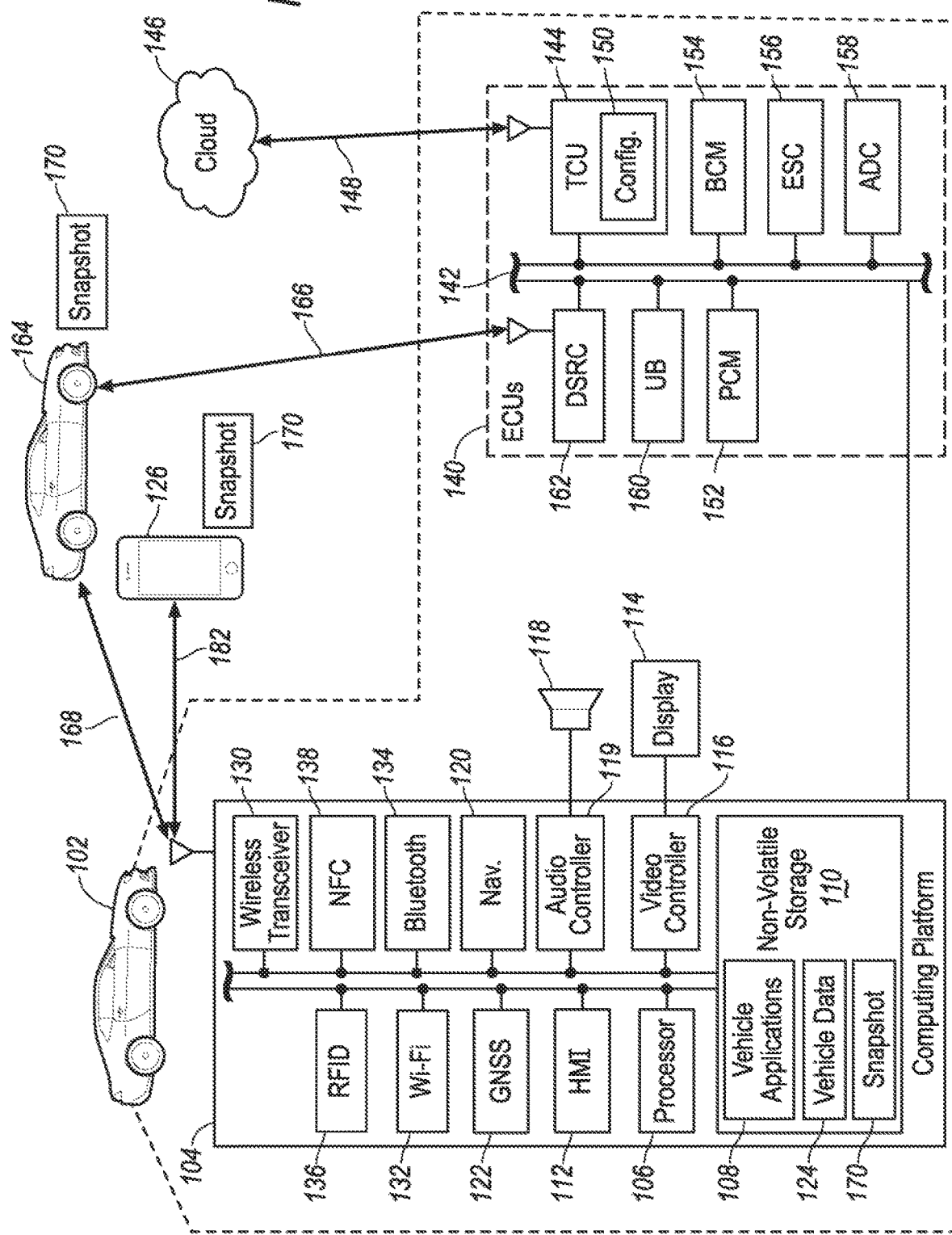
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel'series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other eases the display 116 may be a display only, without touch input capabilities. The computing platform 104 may also drive or otherwise communicate with one or more speakers 118 configured to provide audio output to vehicle occupants by way of an audio controller 119.

The computing platform 104 may also be provided with navigation and route planning features through a navigation controller 120 configured to calculate navigation routes responsive to user input via e.g., the HMI controls 112, and output planned routes and instructions via the speaker 118 and the display 114. Location data that is utilized for navigation may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 124. Navigation software may be stored in the storage 110 e.g. as a part of the vehicle applications 108. Alternatively, navigation software and configuration data (e.g. preferences, saved addresses or the like) may be stored individually within the navigation controller 120 provided with non-volatile storage medium (not shown).

The computing platform 104 may be configured to wirelessly communicate with a mobile device 126 of the vehicle users/occupants via a wireless connection 128 through a wireless transceiver 130. The mobile device 126 may be any of various types of portable computing device, such as cellular phones, tablet computers, smart watches, laptop computers, portable music players, or other device capable of communication with the computing platform 104. The wireless transceiver 130 may be in communication with a Wi-Fi controller 132, a Bluetooth controller 134, a radio-frequency identification (RFID) controller 136, a near-field communication (NFC) controller 138, and other controllers such as a Zigbee transceiver, an IrDA transceiver (not shown), and configured to communicate with a compatible wireless transceiver (not shown) of the mobile device 126.

The computing platform 104 may be further configured to communicate various electronic control units (ECUS) 140 via one or more in-vehicle network 142. The in-vehicle network 142 may include, but is not limited to, one or more of a controller area network (CAN), an Ethernet network, and a media-oriented system transport (MOST), as some examples.

As a few non-limiting examples, the ECUs 142 may include a telematics control unit (TCU) 144 configured to control telecommunication between vehicle 102 and a cloud 146 through a wireless connection 148 using a modem (not shown). The cloud 146 may include one or more servers, or computers connected via various types of wired or wireless networks (e.g. Internet). It is noted that the term cloud is used as a general term throughout the present disclosure and may refer to any cloud-based services involving multiple servers, computers, devices and the like. The TCU 144 may be provided with a local non-volatile storage (not shown) configured to record and store TCU configuration data 150 for the TCU 144. The configuration data 150 may include various data related to the settings of the TCU 144. As a few non-limiting examples, the configuration data 150 may include an identification, network settings to connect to the cloud 146, data package subscriptions, notification preference, or the like.

The ECUs 140 may further include a powertrain control module (PCM) 152 configured to monitor and control the powertrain operation of the vehicle 102. For instance, the PCM 152 may be configured to control operation of the stop/start of an engine (not shown), and/or the driving mode (e.g. economic, normal, or sport) of the vehicle 102. Settings and user preferences may be stored in a local storage as PCM configuration data (not shown) for the PCM 152. The ECUs 140 may further include a body control module (BCM) 154 configured to monitor and control body operations of the vehicle 102. For instance, the BCM 154 may be configured to control and monitor body functions such as door lock/unlock, seatbelt warning, vehicle occupancy, blind spot monitoring or the like using signals detected via one or more sensors (not shown). Similarly, configurations for the BCM 154 may be stored as BCM configuration data (not shown) in the BCM 154.

The ECUs 142 may further include electronic stability controls (ESC) 156 configured to monitor vehicle operation status using signals from the speed sensor (not shown) and control the stability of the vehicle operation whenever needed such as by activating anti-lock brakes (ABS), traction controls or the like. Configurations and settings of the ESC 156 may be stored as ESC configuration data (not shown) in locally in a non-volatile storage medium. The ECUs 140 may further include an autonomous driving controller (ADC) 158 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like. Configurations and settings of the ADC 158 may be stored as ADC configuration data (not shown) in locally in a non-volatile storage medium.

The vehicle 102 may be further provided with a usage-based insurance (UBI) device 160 connected to the in-vehicle network 142 configured to communicate with various ECUs 140 of the vehicle 102 and collect data therefrom. The UBI device 160 may be connected to the in-vehicle network 142 via a connecting port such as an OBD-II connector (not shown). Alternatively, the UBI device 160 may be integrated with the computing platform 104 and communicate with the in-vehicle network 142 directly. The UBI device 160 may be provided with processing power to execute commands and instructions to perform various operations including analyzing data received from the in-vehicle network 142. The UBI device 160 may be provided with a storage configured to record driving data of the vehicle 102. The driving data may be uploaded to the cloud 146 via the TCU 144. UBI device 160 may be individually configured for each vehicle 102 or the vehicle user based on insurance subscriptions. The settings may he stored in the UBI device 160 as UBI configuration data (not shown).

The ECUs 140 may further include a dedicated short-range communication (DSRC) controller 162 configured to wirelessly communicate with compatible controllers of other vehicles or digital entities. For instance, the vehicle 102 may be configured to communicate with a fleet vehicle 164 via the DSRC controller 162 through a DSRC link 166. Settings and configurations of the DSRC controller 162 may be stored locally as DSRC configuration data (not shown). Additionally or alternatively, the vehicle 102 may be configured to communicate with the fleet vehicle 164 via the wireless transceiver 130 through a wireless connection 168. The fleet vehicle 164 may be a vehicle manufactured by the same manufacturer as the vehicle 102 sharing the same or compatible infotainment systems. Alternatively, the fleet vehicle 164 may be made by a different manufacturer but provided with compatible transceivers and software to communicate with the vehicle 102 to sharing data.

The computing platform 104 may be configured to generate and store a snapshot 170 for controller configurations (e.g. the TCU configuration 150) to record a current setting of each controller. As an example, for the TCU configuration 150, the snapshot 170 may include identification, network settings, data package subscriptions, and other settings used by the TCU 144 to connect to the cloud 146. In case that the TCU 144 is replaced, the computing platform 104 may be configured to restore the configurations for a new TCU 144 using the snapshot 170 which includes the TCU configuration 150 generated from the old TCU. In this way, the system may provide the user with a user experience substantially the same as he/she is used to without manually reconfigure the new TCU 144.

The snapshot 170 may include configurations from various controllers. As a few non-limiting examples, the snapshot 170 may include the PCM configuration data including settings of the PCM 152 to control engine and powertrain operations such as engine start/stop, driving modes, or the like. The snapshot 170 may further include the BCM configuration data including settings for door lock/unlock, seatbelt warning, vehicle occupancy, blind spot monitoring controlled by the BCM 154. The snapshot 170 may further include the ESC configuration data including settings for traction controls, the electronic stability program, ABS from the ESC 156. The snapshot 170 may further include the ADC configuration data form the ADC 158 including settings for lane keep assist, safe distance from other vehicles, cruise control, hands-off-wheel alert, autobraking, brake mitigation with multiple sensitivity levels or the like. The snapshot 170 may further include the UBI configuration data from the UBI device 160 including customized UBI settings such as types driving event capturing (e.g. speeding, hard braking or the like) that the vehicle user is subscribed to, event detection threshold, or the like. The snapshot 170 may further include the DSRC configuration data from the DSRC controller 162 including settings for connections and identifications. The snapshot 170 may further include configuration data from other components of the vehicle 102. For instance, the snapshot 170 may include navigation configuration data from the navigation controller 120 including saved addresses, navigation preferences or the like.

The computing platform 104 may be configured to regenerate a new snapshot 170 responsive to detecting a change has been made to the configuration of a controller to record the current updated configurations. The computing platform 104 may overwrite an older version with the newer version snapshot 170 to save storage space of the storage 110. Alternatively, the computing platform 104 may store the newly generated snapshot 170 as a new version without deleting the older version in case that the user wants to use the older version to restore configurations. The computing platform 104 may be further configured to back up the snapshot 170 by sending the snapshot 170 to a digital entity connected to the vehicle 102. For instance, the computing platform 104 may be configured to send the snapshot 170 to the fleet vehicle 164 via a vehicle-to-vehicle (V2V) connection such as the DSRC link 166 and/or the wireless connection 168. Alternatively, the computing platform 104 may be configured to send the snapshot 170 to the mobile device 126 via the wireless connection 128.

Figure 2:
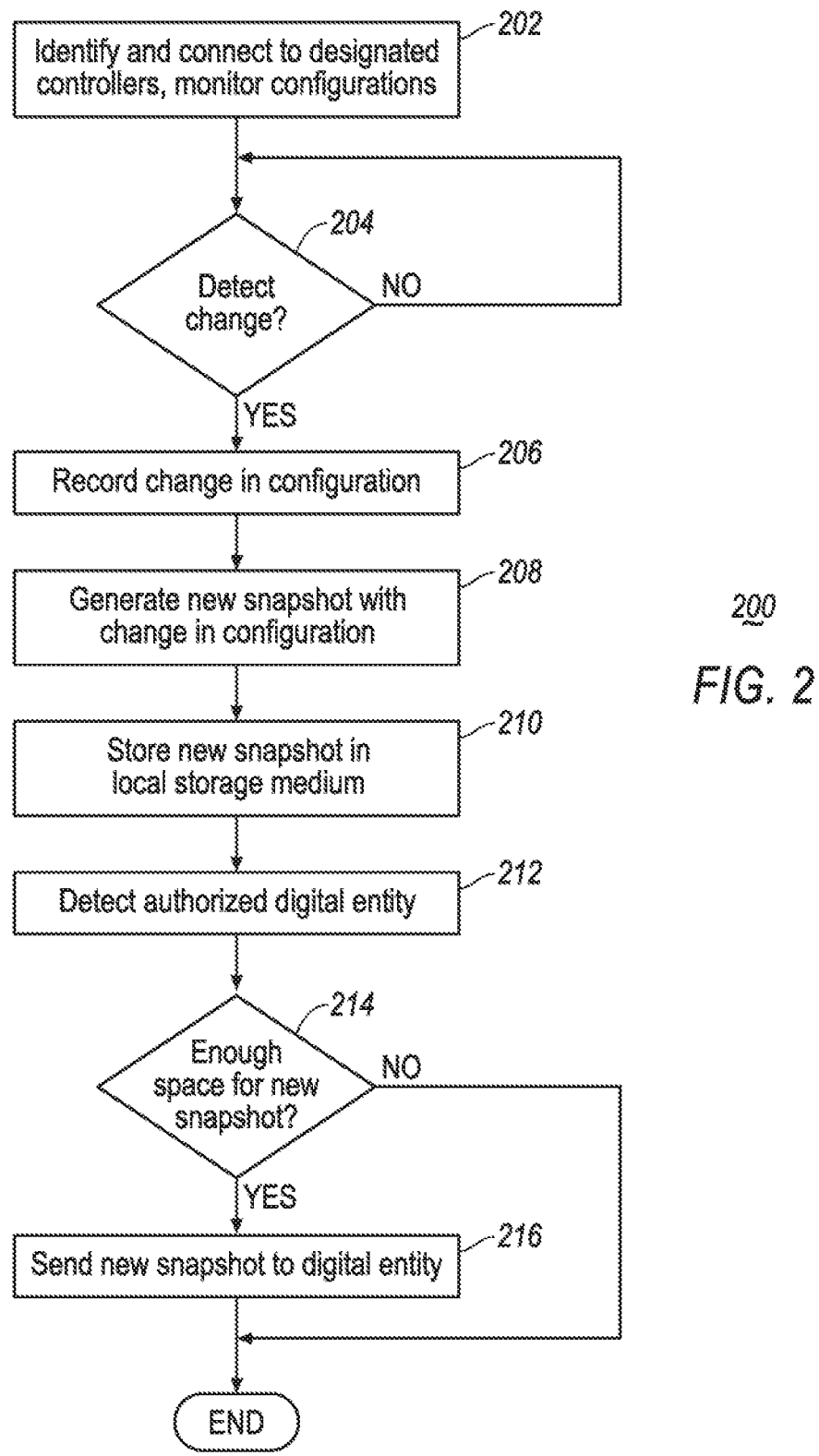
FIG. 2 illustrates an example flow diagram for a snapshot generating process of one embodiment of the present disclosure.

Referring to FIG. 2, a flow diagram of a process 200 for generating snapshot of one embodiment of the present disclosure is illustrated. At operation 202, the computing platform 104 identifies and connects to one or more designated controllers, and monitors the configuration status of the designated controllers. As discussed above, the computing platform may monitor and record configurations data of various ECUs 140 and other controllers (hereinafter, the controllers 140) for backup and restoration purposes. However, due to security and privacy concerns, some controllers may be excluded from this feature. For instance, the computing platform 104 may be configured to exclude the navigation controller 120 from the backup and restoration feature because the home address and saved addresses stored in the navigation controller may rise privacy concerns. Instead the computing platform 104 may be manually configured to only designate certain predefined controllers 140 and perform the backup and restoration feature on those designated controllers 140.

Responsive to detecting a configuration change has been made on one or more of the designated controllers 140 at operation 204, the process proceeds to operation 206 and the computing platform 104 record the new configuration data for the controllers 140. At operation 208, the computing platform 104 generates a new snapshot 170 to record the configuration change of the one or more designated controllers 140. The new snapshot 170 may be generated by modifying a previous version of snapshot stored in the storage 110. For instance, responsive to detecting a modification has been made to the TCU configuration data 150, the computing platform 104 may generate a new snapshot 170 by overwriting the previous TCU configuration in the previous snapshot with the new TCU configuration data 150. In this way, there is no need for the computing platform 104 to re-acquire current configuration data from other designated controllers 140 to generate the new snapshot 170. Alternatively, the computing platform 104 may be configured to generate the new snapshot 170 from the scratch by re-acquiring the current configuration data from each designated controllers 140 each time any configuration change is detected.

At operation 210, the computing platform. 104 stores the new snapshot 170 into the storage 110. The computing platform 104 may be configured to replace the previous snapshot with the new snapshot 170 to save storage space. However, if the storage space is sufficient, the computing platform. 104 may be configured to store the new snapshot 170 as a new version without deleting the previous snapshot to provide more restoration flexibility. The computing platform 104 may be further configured to backup the snapshot 170 to a digital entity provided with storage capability. For instance, the computing platform 104 may connect to the mobile device 126 of the vehicle user and/or the fleet vehicle 164 via a V2V connection for backup purposes. Responsive to detecting a digital entity authorized for snapshot backups at operation 214, the computing platform 104 verifies if there is enough storage space at the digital entity to store the new snapshot. The digital entity may have a specific space for snapshot storage allocated by software the allocated space may vary depending on the total storage capacity of the digital entity. The computing platform 104 may request for the current available allocated space from the digital entity and compare against the size of the new snapshot 170 to determine if the space is enough. Alternatively, the computing platform 104 may send the size of the new snapshot 170 to the digital entity and receive comparison result from the digital entity to determine if the space is enough. Responsive to verifying there is enough storage space for the new snapshot 170, the process proceeds to operation 216 and the computing platform 104 sends the new snapshot 170 to the digital entity to back up the snapshot 170.

Figure 3:
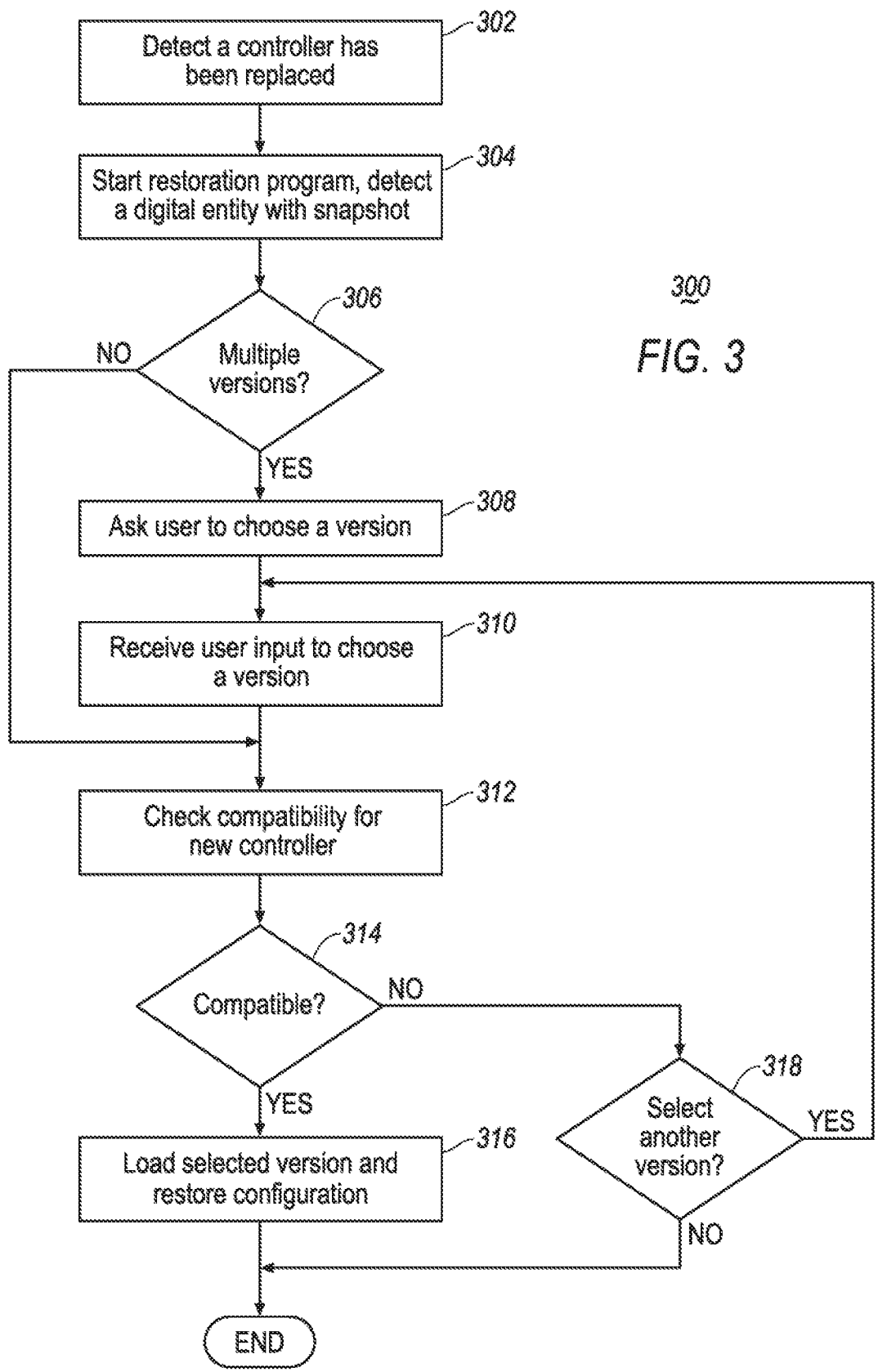
FIG. 3 illustrates an example flow diagram for a configuration recovery process of one embodiment of the present disclosure.

Referring to FIG. 3, a flow diagram of a process 300 for restoring controller configuration using snapshot is illustrated. At operation 302, the computing platform 104 detects a designated controller 140 has been replaced e.g. by identify a new identification or serial number from the controller 140. In response, at operation 304, the computing platform 104 starts to restore the configuration for the new controller 140. The computing platform 104 may launch restoration program 106 and searches for snapshots 170 incorporating configuration data of the designed controller 140 being replaced previously stored in the storage 110. Additionally, the computing platform 104 may be configured to detect a digital entity (e.g. the fleet vehicle 164, or the mobile device 126) storing a snapshot backup 170 connected to the vehicle 102 via a wireless connection. At operation 306, the computing platform 104 verifies if multiple versions of the snapshots 170 are detected. Here, the snapshots 170 may include one or more version from the storage 110 and one or more versions from the digital entity. Responsive to detecting multiple versions of the snapshot 170, the process proceeds to operation 308 and the computing platform 104 outputs a message to ask the user to choose a version to restore.

Responsive to receiving a user input (e.g. via HMI controls 112) selecting an intended version at operation 310, the process proceeds to operation 312 and the computing platform 104 checks if the selected version snapshot 170 is compatible with the new controller. In some situations, the new controller 140 may be a different model from the old controller that is replaced and the software configuration compatibility may not be automatically guaranteed. For instance, if a controller shows signs of dysfunction, a technician may replace the broken controller with the same model new controller with the same software to repair the defect. In this case, a previously recorded configuration within the snapshot 170 is likely to be compatible with the new controller. On the other hand, there may many various reasons causing incompatibilities. For instance, in case that the new controller has a different version of software, the previous configuration data may not be compatible with the software version even the controller model is the same. As another example, a controller replacement may be due to a hardware upgrade to provide the user with more features. In such situation, there is a chance that the new controller may not be able to be restored to a previous setting using the previously recorded configuration data in the snapshot 170.

Responsive to verifying the compatibility between the selected snapshot 170 and the new controller, the process proceeds to operation 316. The computing platform 104 loads the selected version of the snapshot 170 and restore the configuration data for the new controller 140. If the selected version of snapshot 170 is from a digital entity, the computing platform 104 may download the snapshot 170 from the digital entity to perform the configuration restoration. Otherwise, if the snapshot 170 is already in the storage 110, the computing platform 104 may load the snapshot 170 directly from the storage 110. If at operation 314, the computing platform 104 determines the new controller 140 is not compatible with the previous configuration in the snapshot, the process proceeds to operation 318. The computing platform 104 asks the user to select another version in case that multiple versions of snapshot 170 are detected and the process returns to operation 310 to receive another user input selecting another snapshot version to restore. If the user decides not to select another version, the process ends without restoring the configuration.

The operations of processes 200 and 300 may be applied to various situations. For instance, the vehicle 102 may be configured to provide the user with controller configuration a backup and restoration feature via an application 108. The application 108 may allow the user to choose one or more controllers 140 to back up the current configuration. A snapshot 170 may be generated based on the user selection from configuration data received via the in-vehicle network 142, the computing platform 104 may store the snapshot 170 in the storage 110. However, due to various reasons, it is possible that the storage 110 is going to fail overtime. In addition, sometimes the user may want to replace components of the computing platform 104 including the storage 110. To provide a more reliable backup solution, the backup and restoration application 108 may be further configured to send the snapshot 170 to a digital entity for backup purposes. For instance, the digital entity may be a mobile device 126 (e.g. a smart phone of the user) and/or a fleet vehicle 164 (e.g. another vehicle of the same household) provided with software applications to connect to the vehicle 102 and receive the snapshot therefrom. The digital entity may be allocated with a predefined amount of storage space for snapshot backup purposes.

Each time a change made to a designated controller configuration is detected, the backup and restoration application 108 of the computing platform 104 may regenerate a new version of snapshot 170 to incorporate the changes and send the new snapshot 170 to the digital entity whenever connected. The backup and restoration application 108 may allow the user to choose storage options. For instance, the user may be allowed to choose whether to overwrite the older version of snapshot with the newly generated snapshot 170. The same process may be performed for sending the new snapshot 170 to the digital entity. If the storage space is sufficient, the backup and restoration application 108 may be programmed to store the newer version along with the older version by default to provide more restoration options. Alternatively, the backup and restoration application 108 may overwrite the oldest version of snapshot 170 when the storage space reaches the limit. In this way, the customized configurations of each designated controller 140 may be backed up and stored in both the storage 110 as well as at least one digital entity. The back up and storage process does not require access to the cloud or internet. Therefore, the process does not incur any extra cost for data transmission and online storage.

Although most controllers 140 are designed for long-term use, some controllers 140 may break down over time and need to be replaced. Alternatively, sometimes new controller models with more features are available for upgrade. For instance, a new navigation controller 120 may become available years after the vehicle 102 was first sold. The new navigation controller 120 may include features such as live traffic update which is not available for the old navigation controller 120 currently on the vehicle 102. The user may decide to upgrade the system for the new features. The backup and restoration application 108 may be configured to monitor the status of each designed controller 140. Upon detecting a designated controller 140 is replaced (e.g. by detecting a new serial number), the backup and restoration application 108 may automatically start the restoration process and load the snapshot from the storage 110. In case that the digital entity is available and connected to the vehicle 102, the computing platform 104 may further detect if the digital entity has any backup snapshot 170. For instance, this may happen when a technician replaces the old controller 140 and the vehicle user carrying the mobile device 126 is within the vicinity of the vehicle 102. The computing platform 104 may detect the backup snapshot 170 in the mobile device 126.

As discussed previously, there may be multiple versions of the snapshot 170 detected and the user may choose a version to restore. Alternatively, the backup and restoration application 108 may be programmed to use the latest version by default unless the user instructs otherwise. Before using the snapshot 170 to restore the configuration, the computing platform 104 may need to find out if the previous configuration in the snapshot 170 is compatible with the new controller 140. The backup and restoration application 108 may be provided with such compatibility verifying feature. Alternatively, the backup and restoration application 108 may be provided with an interface to access the cloud 146 to check the compatibility. For instance, the backup and restoration application 108 may be configured to send a configuration software version in the snapshot 170 and the model information of the new controller 140 to the cloud 146, and receive a compatibility check result from the cloud 146. If the compatibility check succeeds, the backup and restoration application 108 loads the snapshot from the storage 110 to restore the configuration for the new controller 140. In case the snapshot 170 is from the digital entity, the computing platform 104 may first download the snapshot 170 before using it to restore the configuration. If the currently selected version fails the compatibility check, the user may select another version and perform the compatibility check again. As discussed above, the previous configuration may be incompatible with the new controller for various reasons. The user may try another version of snapshot 170. Otherwise, the restoration process ends without restoring the configuration for the new controller 140.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a vehicle, comprising:
responsive to detecting a configuration modification for a designated controller, collecting current configuration from a plurality of controllers including the designated controller and generating a snapshot using the current configuration as collected;
responsive to detecting a local digital entity connected to the vehicle via a direct wireless connection, verifying if the digital entity has sufficient storage space to store the snapshot;
responsive to verifying the storage space is sufficient, sending the snapshot to the digital entity via the wireless connection;
responsive to detecting the designated controller is replaced by a new controller and the digital entity is wirelessly connected to the vehicle, accessing the snapshot stored in the digital entity;
responsive to detecting multiple versions of the snapshot stored in the digital entity, presenting the multiple versions to a user via a human-machine interface to ask for a user input;
responsive to receiving the user input indicative of selecting one of the multiple versions of the snapshot to restore to, verifying a compatibility between the new controller and the selected version of the snapshot through a remote server;
responsive to receiving a verification from the remote server indicative of the new controller is compatible with the selected version, downloading the snapshot from the digital entity; and
restoring a configuration for the designated controller to the new controller using the snapshot.

2. The method of claim 1, further comprising: generating a newer version of the snapshot by modifying an older version of the snapshot previously generated and stored in a local storage; and responsive to verifying a storage space in the local storage is enough, saving the newer version of the snapshot in the local storage without deleting the old version of the snapshot.

3. The method of claim 1, further comprising:
responsive to receiving a result from the remote server indicative of an incompatibility between the configuration for the designated controller in the selected version of the snapshot and the new controller, outputting a message to ask the user to select another version of the snapshot to restore.

4. The method of claim 1, wherein the authorized digital entity is a fleet vehicle,
the method further comprising:

downloading the snapshot from the fleet vehicle via a wireless connection involving at least one of the following technologies: Wi-Fi, Bluetooth, NFC, RFID, or DSRC.

5. The method of claim 1, wherein the authorized digital entity is a mobile device,
the method further comprising:
downloading the snapshot from the mobile device via a wireless connection involving at least one of the following technologies: Wi-Fi, Bluetooth, NFC, or RFID.

6. A vehicle, comprising:
a wireless transceiver;
a human-machine interface (HMI); and
a processor, programmed to
responsive to detecting a configuration modification to a designated controller of the vehicle, collect current configuration from a plurality of controllers including the designated controller and generate a snapshot using the current configuration as collected,
responsive to detecting a local mobile device and wirelessly connected to the vehicle via a direct wireless link to the wireless transceiver, send a size of the snapshot to the mobile device,
responsive to receiving, from the mobile device, a confirmation indicative of sufficient storage space to accommodate the snapshot, send the snapshot to the mobile device to back up the snapshot,
responsive to detecting the designated controller is replaced by a new controller and the mobile device is wirelessly connected to the vehicle, access the snapshot stored in the mobile device,
responsive to detecting multiple versions of the snapshot stored in the mobile device, present the multiple versions to a user via the HMI to ask for a user input,
responsive to receiving the user input indicative of selecting one of the multiple versions of the snapshot to restore to, verify a compatibility between the new controller and the selected version of the snapshot through a remote server,
responsive to receiving a verification from the remote server indicative of the new controller is compatible with the selected version, download the selected version of the snapshot from the mobile device, and restore the current configuration to the new controller using the snapshot.

7. The vehicle of claim 6, wherein the processor is further programmed to:
verify that an allocated storage space on the mobile device has sufficient data capacity to store the snapshot, before sending the snapshot to the mobile device.

8. The vehicle of claim 6, wherein the processor is further programmed to:
send the snapshot to the mobile device via a wireless connection involving at least one of the following technologies: Wi-Fi, Bluetooth, near-field communication (NFC), radio-frequency identification (RFID), or dedicated short-range communication (DSRC) supported by the wireless transceiver.

9. The vehicle of claim 6, wherein the processor is further programmed to: generate a current version of the snapshot by modifying an old version of the snapshot previously generated and stored in a local storage; and responsive to verifying a storage space in the local storage is enough, save the current version of the snapshot in the local storage without deleting the old version of the snapshot.

10. The vehicle of claim 6, wherein the processor is further programmed to:
upload the snapshot, via the wireless transceiver, to a server device remote to the vehicle;
responsive to detecting the designated controller is replaced by the new controller, access the snapshot from the mobile device via the direct link; and
responsive to detecting multiple versions of the snapshot stored in both the mobile device and the server device, present the multiple versions to a user via the HMI to ask for a user input.

11. An automobile, comprising:
a processor, programmed to
responsive to detecting a configuration modification to a designated controller of the automobile, collect current configuration from a plurality of controllers including the designated controller and generate a snapshot using the current configuration as collected,
responsive to detecting a fleet vehicle wirelessly connected to the automobile via a vehicle-to-vehicle (V2V) connection, send a size of the snapshot to the fleet vehicle,
responsive to receiving, from the fleet vehicle, a confirmation indicative of sufficient storage space to accommodate the snapshot, send the snapshot to the fleet vehicle to back up the snapshot,
responsive to detecting a designated controller is replaced by a new controller and the fleet vehicle is wirelessly connected to the automobile via the V2V connection, access the fleet vehicle to search for the snapshot stored in the fleet vehicle,
responsive to detecting multiple versions of the snapshot stored in the fleet vehicle, present the multiple versions to a user via a user interface to ask for a user input,
responsive to receiving the user input indicative of selecting one of the multiple versions of the snapshot to restore to, send a configuration software version number included in the selected version of the snapshot and a model number of the new controller to a server to verify a compatibility,
responsive to receiving a verification from a remote server indicative of the new controller is compatible with the selected version, download the selected version of the snapshot from the fleet vehicle, and restore a configuration of the designated controller to the new controller using the snapshot.

12. The automobile of claim 11, wherein the processor is further programmed to: responsive to receiving a result from the remote server indicative of an incompatibility between the selected version of the snapshot and the new controller, output a message to ask the user to select another version of the snapshot to restore.

13. The automobile of claim 11, wherein the V2V connection is a dedicated short range communication (DSRC) connection.

* * * * *